United States Patent
Lynch et al.

(10) Patent No.: US 10,056,991 B2
(45) Date of Patent: Aug. 21, 2018

(54) REMOTE DATA CONCENTRATOR SELF-TEST

(71) Applicant: Simmonds Precision Products, Inc., Vergennes, VT (US)

(72) Inventors: Michael A. Lynch, Shelburne, VT (US); Jonathan Wieman, Ferrisburg, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 15/399,012

(22) Filed: Jan. 5, 2017

(65) Prior Publication Data

US 2018/0191451 A1   Jul. 5, 2018

(51) Int. Cl.
| | | |
|---|---|---|
| *H04B 5/00* | (2006.01) | |
| *H04B 17/19* | (2015.01) | |
| *H04W 4/00* | (2018.01) | |
| *H04B 1/40* | (2015.01) | |
| *H04W 4/80* | (2018.01) | |

(52) U.S. Cl.
CPC ............... *H04B 17/19* (2015.01); *H04B 1/40* (2013.01); *H04B 5/0031* (2013.01); *H04W 4/008* (2013.01); *H04W 4/80* (2018.02)

(58) Field of Classification Search
CPC ........ H04B 17/19; H04B 1/40; H04B 5/0031; H04W 4/008
See application file for complete search history.

(56) References Cited

U.S. PATENT DOCUMENTS

| | | |
|---|---|---|
| 5,471,146 A | 11/1995 | Krayeski et al. |
| 8,064,901 B2 | 11/2011 | Lennartson et al. |
| 8,385,869 B2 | 2/2013 | Feenaghty et al. |
| 8,467,735 B2 | 6/2013 | Giles et al. |
| 8,847,754 B2 | 9/2014 | Buchheim et al. |
| 2004/0235432 A1 | 11/2004 | Lin et al. |
| 2005/0250457 A1 | 11/2005 | Mester et al. |
| 2006/0197538 A1 | 9/2006 | Leinonen et al. |
| 2011/0250838 A1* | 10/2011 | Alexopoulos .......... H01Q 19/10 455/41.1 |
| 2015/0043623 A1* | 2/2015 | Kawasaki ................ H04B 1/40 375/219 |
| 2016/0142928 A1 | 5/2016 | Burns et al. |
| 2016/0308626 A1* | 10/2016 | Mow ...................... H04B 17/19 |

FOREIGN PATENT DOCUMENTS

| | | |
|---|---|---|
| EP | 2677599 A1 | 12/2013 |
| EP | 3085617 A1 | 10/2016 |

OTHER PUBLICATIONS

Extended European Search Report for European Patent Application No. 17210293.1, dated Mar. 29, 2018.

* cited by examiner

*Primary Examiner* — Xin Jia
(74) *Attorney, Agent, or Firm* — Locke Lord LLP; Scott D. Wofsy; Christopher J. Cillié

(57) ABSTRACT

A remote data concentrator includes an enclosure with an interior divided into first and second compartments, a first transceiver, and a second transceiver. The first transceiver is seated within the first compartment and the second transceiver is seated within the second compartment. The first and second compartments are radio-frequency isolated such that the transceivers can independently communicate with external wireless devices and communicate with one another for testing readiness of the RDC for communication with external wireless devices.

19 Claims, 5 Drawing Sheets

REMOTE DATA CONCENTRATOR SELF-TEST

BACKGROUND OF THE INVENTION

1. Field of the Invention

The present disclosure relates wireless communication, and more particularly to testing wireless devices like remote data concentrators for wireless communication.

2. Description of Related Art

Sensors, such as in aircraft, are commonly used to sense a parameter such as temperature, pressure, proximity, etc. The sensors are typically communicative with an application system controller to provide the status of parameters measured by the sensors. In some systems with many sensory inputs remote data concentrator (RDC) units are used to collect and communicate sensor data to system controllers. More recently, wireless sensors are gaining popularity due weight savings associated with the reduction of wiring necessary for sensor connectivity.

RDCs typically are connected to a communication bus, which is used to route information collected by the remote data concentrators from the sensors to other equipment in the system. In wireless implementations the sensors themselves communicate with wireless-enabled RDCs. Wireless communication between the sensors and the RDCs reduces the need to route wiring to the physical location of the sensor, further reducing weight, installation time, troubleshooting, and maintenance throughout the life of the aircraft. For wireless implementations, it can be desirable to have the ability to test the functional readiness of the wireless connectivity of RDCs prior to installation, after installation, and during service.

Such conventional methods and systems have generally been considered satisfactory for their intended purpose. However, there is still a need in the art for improved RDCs that enable self-test functionality. The present disclosure provides a solution for this need.

SUMMARY OF THE INVENTION

A remote data concentrator includes an enclosure with an interior divided into first and second compartments, a first transceiver, and a second transceiver. The first transceiver is seated within the first compartment and the second transceiver is seated within the second compartment. The first and second compartments are radio-frequency isolated such that the transceivers can independently communicate with external wireless devices wirelessly and communicate with one another for testing readiness of the RDC for communication with external wireless devices.

In certain embodiments, the enclosure can have an RF-opaque divider separating the first compartment from the second compartment. The enclosure can be further divided into a third compartment. The third compartment can be separated from the first compartment and/or the second compartment by a second RF-opaque divider. An RF-transparent first radome can separate the first compartment from the external environment. An RF-transparent second radome can separate the second compartment from the external environment.

In accordance with certain embodiments, the first compartment can have a first transceiver shelf extending about the first compartment. The second compartment can have a second transceiver shelf extending about the second compartment. The second transceiver shelf can be coplanar with the first transceiver shelf. The first transceiver can be seated on the first transceiver shelf. The second transceiver can be seated on the second transceiver shelf.

It is also contemplated that, in accordance with certain embodiments, the RDC can include a first antenna operatively connected to the first transceiver and arranged within the first compartment. The RDC can include a second antenna operatively connected to the second transceiver and arranged within the second compartment. An antenna pattern of the first antenna can overlap an antenna pattern of the second antenna outside of the enclosure for near-field communication when the first and second transceivers are switched to a common wireless channel. It is contemplated that RDC can include a control module disposed in communication with a non-transitory machine readable memory having instructions recorded thereon for testing readiness of the RDC with external wireless devices by transmitting RF energy from the first transceiver using the first antenna and determining readiness using RF energy received by the second transceiver via the second antenna.

A method of testing readiness of an RDC for wireless communication with external devices includes switching one of first and second transceivers arranged within an enclosure to a common channel and transmitting radio-frequency (RF) energy using the first transceiver. Readiness of the RDC for wireless communication with external wireless devices is determined using transmitted RF energy received by the second transceiver.

In certain embodiments, the method can include transmitting RF energy using the second transceiver and determining readiness using transmitted RF energy received by the first transceiver. The RDC can be determined unready for wireless communication when one or more of the first and second transceivers are unready for wireless communication with wireless devices disposed in the external RF environment. The first transceiver can transmit using a first antenna and the second transceiver can transmit using a second antenna in near field communication with the first antenna. Testing can done in a test environment or in-situ, such as by comparing in-situ measurements with measurements acquired in a test environment or past in-situ measurement values.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
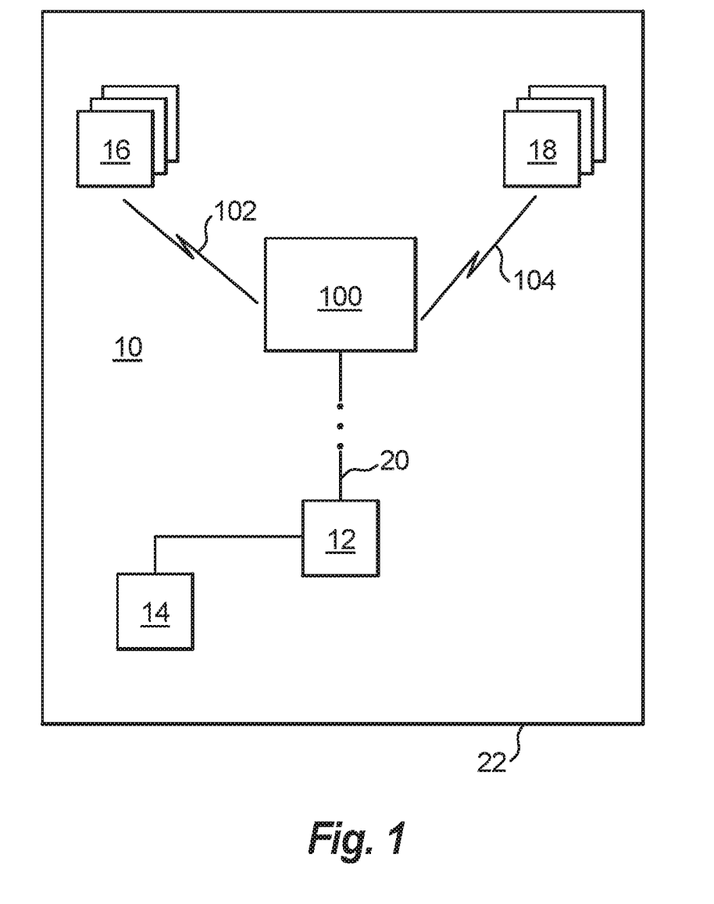
FIG. 1 is a schematic view of an exemplary embodiment of a wireless network constructed in accordance with the present disclosure, showing sensors arranged within an aircraft connected to a remote data concentrator (RDC) over first and second wireless channels.

Reference will now be made to the drawings wherein like reference numerals identify similar structural features or aspects of the subject disclosure. For purposes of explanation and illustration, and not limitation, a partial view of an exemplary embodiment of a remote data concentrator (RDC) in accordance with the disclosure is shown in FIG. 1 and is designated generally by reference character 100. Other embodiments of remote data concentrators and methods of testing readiness of remote data concentrators for wireless communication with devices in the external radio frequency (RF) environment in accordance with the disclosure, or aspects thereof, are provided in FIGS. 2-5, as will be described. The systems and methods described herein can be used for providing connectivity for wireless devices in aircraft sensor networks, though the present disclosure to aircraft sensor networks or to sensor connectivity in general. It is understood also that a remote data concentrator (RDC) could contain a plurality of transceivers and although only two are described here for simplicity, this methodology is extensible to any number of internal transceivers in a remote data concentrator (RDC).

Referring to FIG. 1, a network 10 is shown. Network 10 includes a system controller 12 disposed in communication with a system 14, one or more first wireless device 16, and one or more second wireless device 18. RDC 100 is connected to system controller 12 through a physical connection 20, which may be a digital communication bus or cable. The one or more first wireless device 16 is wirelessly connected to RDC 100 by a first wireless channel 102. The one or more second wireless device 18 is wirelessly connected to RDC 100 by a second wireless channel 104. In the illustrated exemplary embodiment, network 10 is data emplaced in an aircraft 22 including a plurality wireless sensor arranged on aircraft 22 for providing input to aircraft system. This is for illustration purposes only and is non-limiting. It is to be understood and appreciated that embodiments of RDC 100 and the related methods disclosed herein can be employed in other types of wireless networks, as suitable for an intended application.

Figure 2:
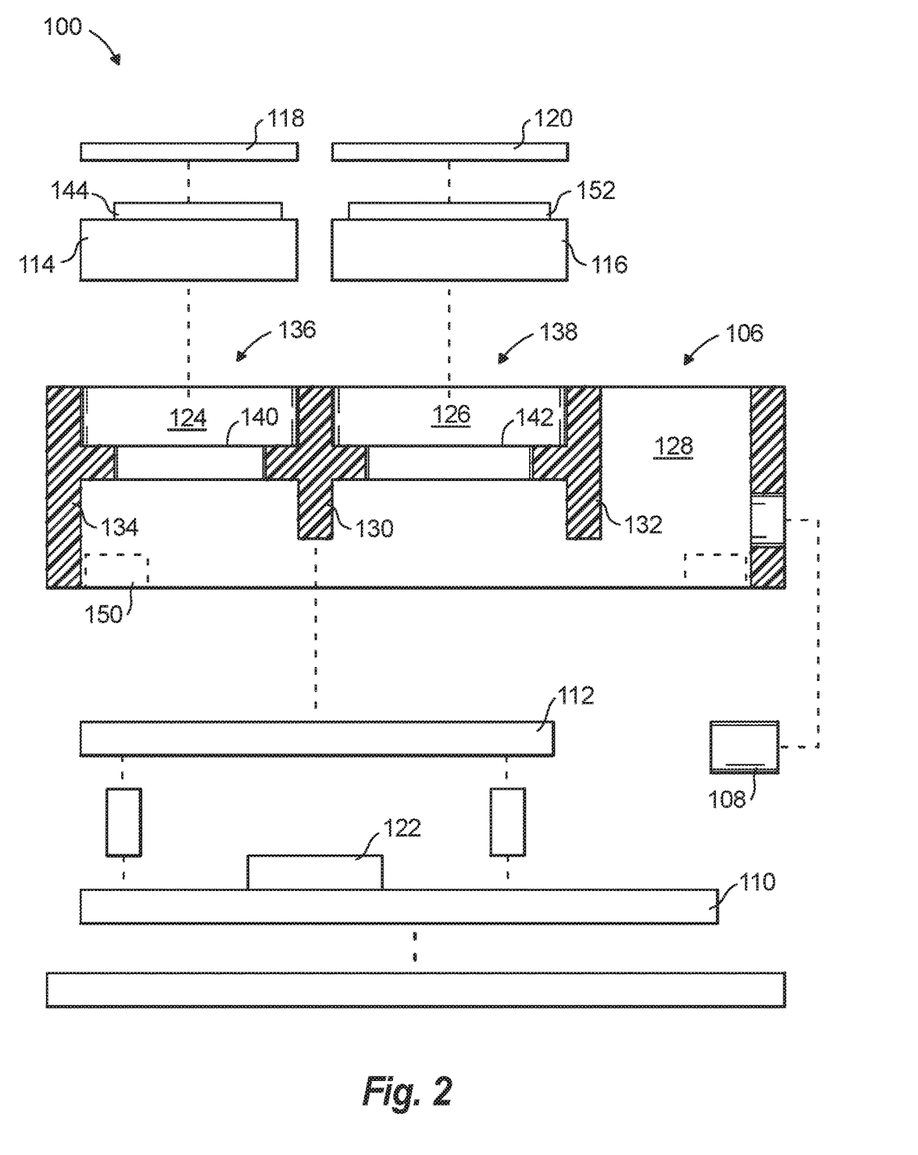
FIG. 2 is an exploded view of the RDC shown in FIG. 1, showing the transceivers, transceiver antennas, a printed wiring board supporting the transceivers, and a serial connector communicative with each transceiver separate channels.
Figure 3:
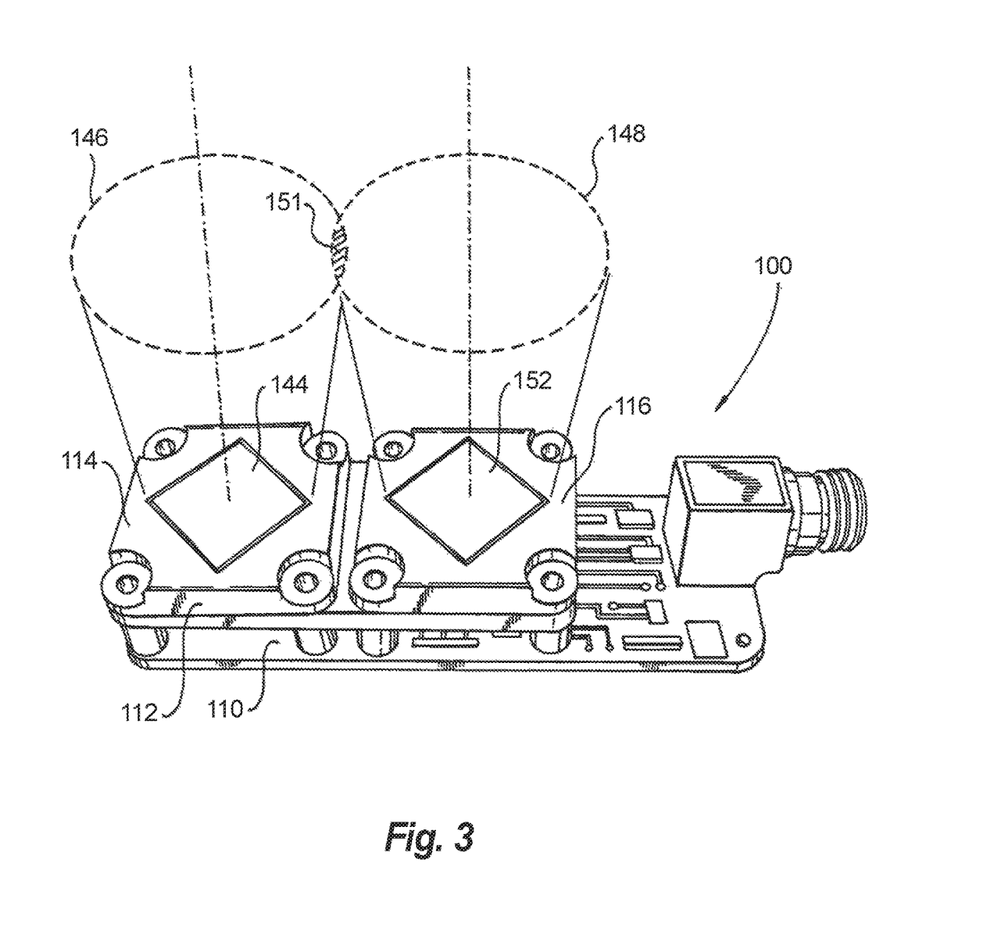
FIG. 3 is a perspective view of the RDC shown in FIG. 1 with the enclosure removed, showing antenna patterns of transceivers disposed within the RDC enclosure and spanning internal and external RF environments separated by the transceiver enclosure.

With reference to FIGS. 2 and 3, RDC 100 is shown in exploded views. RDC 100 includes an enclosure 106, a connector 108, a printed wiring board (PWB) 110, and an interface board 112. RDC 100 also includes a first transceiver 114, a second transceiver 116, a first radome 118, and a second radome 120. Connector 108 is arranged for connection to a wired data communication bus, e.g., via physical connection 20 (shown in FIG. 1), and may include a serial or coaxial type connector arrangement for interfacing one or more of first wireless device 16 (shown in FIG. 1) and second wireless device 18 (shown in FIG. 1) via first wireless channel 102 (shown in FIG. 1) and second wireless channel 104 (shown in FIG. 1) with controller 14 (shown in FIG. 1).

The interior of enclosure 106 is divided into a first compartment 124, a second compartment 126, and a third compartment 128. First transceiver 114 is seated within first compartment 124 and second transceiver is seated within second compartment 126. First compartment 124 is RF-isolated from second compartment 126 such that first transceiver 114 and second transceiver 116 can communicate independently, e.g., free of RF interference, with external wireless devices and communicate with one another for testing readiness of RDC 100 for communication with external wireless devices. For example, when first transceiver 114 is switched to first wireless channel 102 (shown in FIG. 1), first transceiver 114 can wirelessly communicate with the one or more first wireless device 16 (shown in FIG. 1) without interference from RF emitted by second transceiver 116. At the same time, when second transceiver 116 is switched to second wireless channel 104 (shown in FIG. 1), second transceiver 116 can wirelessly communicate with the one or more second wireless device 18 (shown in FIG. 1) without interference from RF emitted by first transceiver 114.

Enclosure 106 also includes a first divider 130 and a second divider 132. First divider 130 includes an RF-opaque material 134 such as aluminum or aluminum alloy and separates second compartment 126 from first compartment 124. Second divider 132 also includes RF-opaque material 134 and separates third compartment 128 from second compartment 126. First divider 130 and second divider 132 cooperate with interior surfaces of enclosure 106 with first compartment 124 and second compartment 126 to shield first transceiver 114 from second transceiver 116 and vice versa. First divider 130 and second divider 132 may also shield third compartment 128 from first transceiver 114 and second transceiver 116, thereby allowing placement of accessories therein unmolested by stray RF energy, such as electronics or a control module 122.

Enclosure 106 has a plurality of apertures that place the enclosure interior in communication with the external environment. In this respect enclosure 106 has a first aperture 136 and a second aperture 138. First aperture 136 bounds first compartment 124 and seats first radome 118 such that first radome 118 overlays first transceiver 114, first transceiver 114 being seated on a first transceiver shelf 140. Second aperture 138 bounds second compartment 126 and seats second radome 120 such that second radome 120 overlays second transceiver 116, second transceiver 116 being seated on a second transceiver shelf 142. First radome 118 and second radome 120 each include an RF-transmissive material, such as a polymeric material, thereby allowing RF communication between first compartment and second compartment via the external environment as well as with wireless devices in the external environment. First radome 118 and second radome 120 are disposed on side of enclosure 106 opposite one or more mounting features 150, which cooperate with antenna of the transceivers to error proof installation of RDC 100. In the illustrated exemplary embodiment enclosure 106 also has a third aperture for seating connector 108 and a fourth aperture for seating a cover, facilitating assembly of RDC 100.

First transceiver shelf 140 and second transceiver shelf 142 are each coplanar with one another. The coplanar arrangement causes RF energy emitted by first transceiver 114 through a first antenna 144 to pass through first radome 118 in a first antenna pattern 146. The first antenna pattern 146 overlaps with a second antenna pattern 148, an overlap 151 therebetween providing a near-field RF link between the first transceiver 114 and second transceiver 116. It is contemplated that second transceiver 116 have a second antenna 152 for generating second antenna pattern 148, second antenna 152 being similar (or identical) to first antenna 144 for communicating wirelessly with wireless devices in the external environment. The antenna patterns may be parallel with one another, as indicated by the antenna pattern axes shown in FIG. 3, for reducing RF interference in dense wireless environments with small frequency separation between wireless channels while providing near-field communication capability when switched to a common wireless channel.

PWB 110 below first compartment 124 and second compartment 126, opposite first aperture 136 and second aperture 138. Connector 108 is coupled to PWB 110 for placing PWB 110, and first transceiver 114 and second transceiver 116 therethrough, in communication with physical connection 20 (shown in FIG. 1). Interface board 112 is connected to PWB 110 between PWB 110 and first aperture 136 and second aperture 138, and in the illustrated exemplary embodiment is spaced apart from PWB 110 by a plurality of standoffs. Control module 122 is supported by PWB 110 for operating first transceiver 114 and second transceiver 116. It is contemplated that control module 122 be operatively connected to first transceiver 118 and second transceiver 116 switching more wireless channels, e.g., first wireless channel 102 (shown in FIG. 1) and/or second channel 104 (shown in FIG. 1), each being switched to different channels for communicating with external wireless devices and each switched to a common channel for communicating with one another for RDC self-testing. This allows for testing both transceivers in isolation from the external environment, enabling testing RDC readiness in-situ, e.g., installed in an aircraft in a dynamic RF environment, and in relation to a performance metric in an RF-free environment, e.g., within an anechoic chamber.

Figure 4:
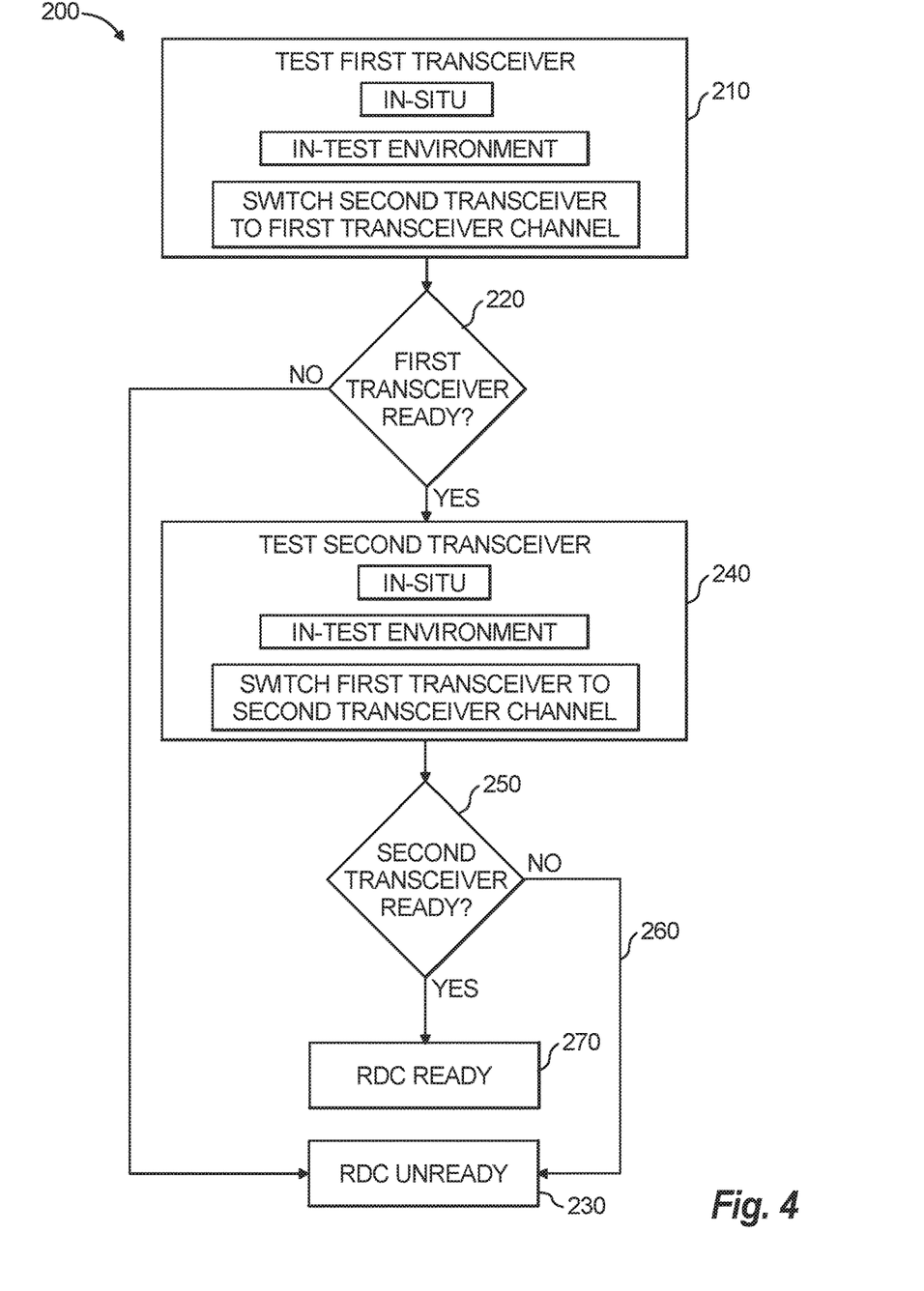
FIG. 4 is flow chart of a method for testing readiness of an RDC for communication with wireless devices disposed in the external RF environment, showing steps of the method.

With reference to FIG. 4, method 200 of testing readiness of an RDC, e.g., RDC 100 (shown in FIG. 1), for communication with external wireless devices, e.g., first wireless device 16 and/or second wireless device 18 (shown in FIG. 1), is shown. Method 200 includes testing a first transceiver, e.g., first transceiver 114, as shown with box 210. A determination as to whether the first transceiver is ready for communication with external wireless devices, e.g., first wireless device 16 (shown in FIG. 1) and/or second wireless device 18 (shown in FIG. 1), as indicated with box 220.

When the first transceiver is determined to be unready for wireless communication, the RDC is determined to be unready, as shown with box 230. When the first transceiver is determined to be ready for wireless communication the second transceiver is tested, e.g., second transceiver 116, as shown with box 240. A determination is then made as to whether the second transceiver is ready for communication with external wireless devices, as shown with box 250. When the second transceiver is determined to be unready for wireless communication, the RDC is determined to be unready, as shown with arrow 260. When the second transceiver is also determined to be ready for wireless communication with external devices, the RDC is determined to be ready for external wireless devices, as shown with box 270.

Testing the first transceiver can include re-purposing the second transceiver. In this respect the second transceiver can be switched from a different channel than the first transceiver to the channel assigned to the first transceiver, i.e. to a common channel. The first transceiver can thereafter transmit RF energy using a first antenna, e.g., first antenna 144 (shown in FIG. 2), and the determination of first transceiver readiness made using the second transceiver. Readiness can be determined by the second transceiver from RF energy received by the second transceiver from the first antenna using a second antenna, e.g., second antenna 152 (shown in FIG. 2). For example, the RF energy transmitted by the first antenna, reflected from objects in the external environment, and received by the second antenna can be used to determine readiness of the RDC for communication. Alternatively (or additionally), RF energy transmitted by the first antenna and received by the second antenna via overlap in the antenna patterns of the first and second antennas can be used to determine readiness of the RDC for communication. It is contemplated that testing the first transceiver can be done in a test environment, for example, during qualification testing. It is also contemplated that testing the first transceiver can be done in-situ, for example, in an aircraft, e.g., aircraft 22 (shown in FIG. 1).

Testing the second transceiver can include re-purposing the first transceiver. In this respect the first transceiver can be switched from a different channel than the second transceiver to the channel assigned to the first transceiver, i.e. to a common channel. The second transceiver can thereafter transmit RF energy using a second antenna and the determination of second transceiver readiness made using the first transceiver. Readiness can be determined by the first transceiver from RF energy received by first antenna from the second antenna. It is contemplated that testing the second transceiver can also be done in a test environment, for example, during qualification testing, or in-situ, for example, when installed in an aircraft. It is also contemplated that the second transceiver can be tested subsequent to testing the first transceiver, thereby avoiding the need for a second switching event for testing the RDC.

Testing can include, by way of non-limiting example, sweeping across channels in a waveband measuring received signal strength indication (RSSI) to determine antenna transceiver flatness or RF environmental band flatness. Testing can also include testing one or more of transmission power, receiver sensitivity, dynamic range, accuracy, and/or linearity at a plurality of output power settings. Testing can further include adjacent channel and out-of-band testing. In certain embodiments testing can include one or more of testing end-to-communication using path loss, antenna gain, transmitter power, receiver sensitivity, and quality (e.g., packet or bit error rate) between any two transceivers in a single or multiple RDC system.

Figure 5:
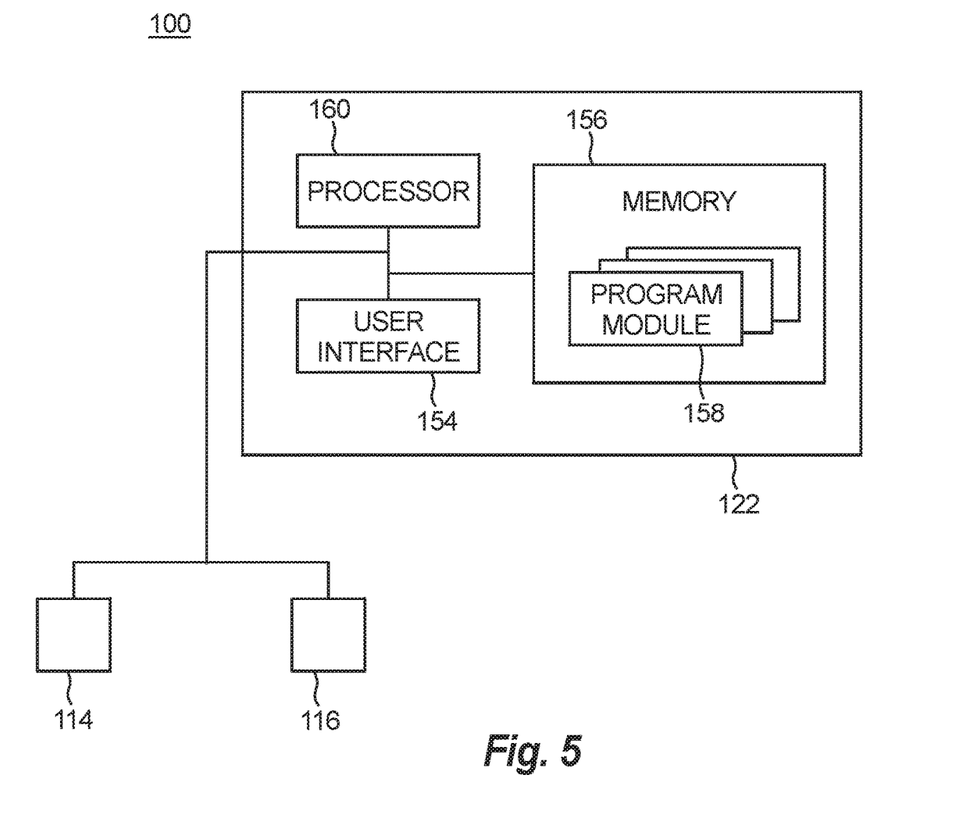
FIG. 5 is a schematic view of the RDC shown in FIG. 1, showing a control module operatively connected to the transceivers.

With reference to FIG. 5, control module 122 is shown according to an exemplary embodiment. Control module 122 includes a processor 160, an interface 154, and a memory 156. Interface 154 provides communication between processor 160 and external devices, e.g., system controller 12 (shown in FIG. 1), and operably connects processor 160 to first transceiver 114 and second transceiver 116. Interface 154 also allows for external control of RDC 100.

Processor 160 is disposed in communication with memory 156. Memory 156 includes a non-transitory machine readable medium having a plurality of program modules 158 recorded thereon. Program modules 158 include instructions that, when read by processor 160, cause processor 160 (and thereby control module 122) to undertake certain actions. In particular, the instructions cause processor 160 to execute the steps of method 200 (shown in FIG. 4) using RDC 100 (shown in FIG. 1). Although a particular embodiment of a control module is shown in the described embodiment, it is to be understood and appreciated that control module 122 can include circuity, software, or a combination of software and circuitry.

The methods and systems of the present disclosure, as described above and shown in the drawings, provide for RDCs with superior properties including the ability to test readiness of the RDC for wireless communication with wireless devices disposed in the RF environment external of the RDC using the internal RF environment of the RDC. The ability to self-test RF functionality without specialized test equipment can provide improved reliability of the RDC described above. Also testing in the factory environment as well as in situ when deployed on the aircraft are both desirable. Once installed on the aircraft, testing may be performed after initial installation and periodically thereafter to confirm the operational readiness of the wireless system components before use. Any failure of a component would indicate the need for service or, in rare cases, a decision may be made to proceed with operation with the disabled component. While the apparatus and methods of the subject disclosure have been shown and described with reference to preferred embodiments, those skilled in the art will readily appreciate that change and/or modifications may be made thereto without departing from the scope of the subject disclosure.

What is claimed is:

1. A remote data concentrator (RDC), comprising:
an enclosure having an interior divided into a first compartment and a second compartment configured to have a first transceiver seated within the first compartment and a second transceiver seated within the second compartment such that radio frequency (RF) energy transmitted from the first transceiver is blocked from reaching the second transceiver in a direct line of sight fashion, thereby allowing operational testing of the RDC without requiring wireless transmitting or receiving devices external to the RDC;
a first antenna operatively connected to the first transceiver and arranged within the first compartment; and
a second antenna operatively connected to the second transceiver and arranged within the second compartment,
wherein an antenna pattern of the first antenna overlaps an antenna pattern of the second antenna outside of the enclosure for RF communication when the first and second transceivers are switched to a common wireless channel.

2. The RDC as recited in claim 1, wherein the RDC is configured for functional testing after the RDC is installed in-situ, and baseline functionality is retestable, after changes to a vehicle that the RDC is installed within, that could alter operational parameters of the RDC.

3. The RDC as recited in claim 1, wherein the enclosure has an RF-opaque divider separating the first compartment from the second compartment.

4. The RDC as recited in claim 1, wherein first compartment has a first transceiver shelf extending about a periphery of the first compartment, the second compartment has a second transceiver shelf extending about a periphery of the second compartment, wherein the second transceiver shelf is coplanar with the first transceiver shelf.

5. The RDC as recited in claim 1, further comprising an RF-transparent radome separating the first compartment from the external environment.

6. The RDC as recited in claim 5, wherein the radome is a first radome, and further comprising a second radome separating the second compartment from the external environment.

7. The RDC as recited in claim 5, further comprising a mounting feature arranged on the enclosure and on a side of the enclosure opposite the radome.

8. The RDC as recited in claim 1, wherein the RF communication is near-field communication.

9. The RDC as recited in claim 1, wherein the enclosure includes a third compartment separated from the second compartment by an RF-opaque divider.

10. The RDC as recited in claim 1, further comprising a control module operatively connected to the first and second transceivers and disposed in communication with a memory, the memory having instructions recorded thereon which cause the control module to:
switch one of first and second transceivers to a common channel;
transmit RF energy using the first transceiver; and
determine RDC readiness using RF energy received by the second transceiver.

11. The RDC as recited in claim 1, further comprising an interface board underlying the first antenna and the second antenna, the interface board connected to the first antenna through the first transceiver and to the second antenna through the second transceiver, an RF opaque divider separating the second antenna from the first antenna within the enclosure.

12. The RDC as recited in claim 1, wherein the enclosure defines an aperture, one of the first and second transceivers being in RF communication with the external environment through the aperture.

13. A method of testing a remote data concentrator (RDC), comprising:
operatively connecting a first transceiver arranged within a first compartment of an enclosure to a first antenna;
operatively connecting a second transceiver arranged within a second compartment of the enclosure to a second antenna;
setting a first transceiver positioned within a first compartment of an enclosure and a second transceiver positioned within a second compartment of the enclosure to a common channel, wherein an antenna pattern of the first antenna overlaps an antenna pattern of the second antenna outside of the enclosure for RF communication when the first and second transceivers are switched to the common wireless channel;
transmitting radio-frequency (RF) energy using the first transceiver;
receiving radio-frequency (RF) energy transmitted from the first transceiver with the second transceiver; and
determining functional operation of the RDC based on the received RF energy.

14. The method as recited in claim 13, further comprising reflecting the transmitted RF energy prior to the receiving with the second transceiver.

15. The method as recited in claim 13, further comprising:
transmitting radio-frequency (RF) energy using the second transceiver; and
determining readiness of the RDC for wireless communication with external wireless devices using transmitted RF energy received by the first transceiver.

16. The method as recited in claim 15, further comprising determining the RDC unready for wireless communication when one or more of the first and second transceivers are unready for wireless communication with wireless devices disposed in the external RF environment.

17. The method as recited in claim 13, wherein the first transceiver transmits the RF energy using a first antenna, the second transceiver transmits using a second antenna, and wherein the first and second transceivers are near field communication with one another via the channel.

18. The method as recited in claim 13, wherein the testing is done in a test environment.

19. The method as recited in claim 13, wherein the testing is done in-situ.

\* \* \* \* \*